US008726711B2

(12) United States Patent
Flegel et al.

(10) Patent No.: US 8,726,711 B2
(45) Date of Patent: May 20, 2014

(54) APPARATUSES AND METHODS FOR ROLLING ANGLED THREADS

(75) Inventors: Terry L. Flegel, Waynesboro, PA (US); V. Brian Shook, Waynesboro, PA (US)

(73) Assignee: Kennametal Inc., Latrobe, PA (US)

( * ) Notice: Subject to any disclaimer, the term of this patent is extended or adjusted under 35 U.S.C. 154(b) by 359 days.

(21) Appl. No.: 12/836,174

(22) Filed: Jul. 14, 2010

(65) Prior Publication Data
US 2012/0011912 A1 Jan. 19, 2012

(51) Int. Cl.
*B21H 3/04* (2006.01)
*A01B 29/04* (2006.01)

(52) U.S. Cl.
USPC .................. 72/104; 72/108; 470/70; 492/30

(58) Field of Classification Search
USPC ............. 72/95, 103–105, 107, 108, 111, 114, 72/252.5, 370.21; 492/27, 30, 33; 470/10, 470/66, 70, 71, 84, 185, 188
See application file for complete search history.

(56) References Cited

U.S. PATENT DOCUMENTS

| 2,937,547 | A | * | 5/1960 | Moeltzner | 72/95 |
| 3,626,733 | A | * | 12/1971 | Zook et al. | 72/104 |
| 3,651,678 | A | * | 3/1972 | Zook et al. | 72/103 |
| 3,683,437 | A | * | 8/1972 | Larson | 470/10 |
| 3,942,349 | A | * | 3/1976 | Williams et al. | 72/98 |
| 4,785,649 | A | | 11/1988 | Watanabe et al. | |
| 5,769,161 | A | | 6/1998 | Borden | |
| 7,647,963 | B2 | * | 1/2010 | Carstensen | 166/176 |
| 7,726,219 | B2 | | 6/2010 | Conen | |
| 7,735,879 | B2 | | 6/2010 | Toscano et al. | |
| 2002/0112518 | A1 | * | 8/2002 | Sannomiya | 72/103 |
| 2004/0107755 | A1 | * | 6/2004 | Koike et al. | 72/103 |

OTHER PUBLICATIONS

American Petroleum Institute, "Specification for Sucker Rods," API Specification 11B, 25th Edition, Jan. 1, 1995.
ATI Landis Threading, "Landis CNC EZ Roller," Products and Technical Manual, Jan. 2010.
American Petroleum Institute, "Exploration and Production," pp. 1-34, undated.
Sergio A. Diaz, "Sucker Rod Pump," http://web.mit.edu/2.972/www/reports/sucker_rod_pump/sucker_rod_pump.html, pp. 1-7, printed Jun. 4, 2010.
ATI Landis Threading, "Landis CNC Thread Rolling Tools," undated.

* cited by examiner

*Primary Examiner* — Debra Sullivan
(74) *Attorney, Agent, or Firm* — Matthew W. Smith, Esq.

(57) ABSTRACT

In various embodiments, a tapered thread roll, a set of tapered thread rolls, a thread rolling tool, and a thread rolling method are provided for rolling angled or tapered threads onto a workpiece to create a threaded workpiece. In at least one embodiment, the threaded workpiece may comprise a polished rod or a polished rod precursor as specified by the American Petroleum Institute for use in an oil-field sucker-type pump, for example.

6 Claims, 13 Drawing Sheets

APPARATUSES AND METHODS FOR ROLLING ANGLED THREADS

TECHNICAL FIELD

This disclosure is directed to apparatuses and methods for rolling angled threads on a blank of material or a workpiece and, in one application, for rolling angled threads on polished rods used in sucker pumps.

BACKGROUND

Sucker rods are rods, typically made of steel or other materials, providing a mechanical connection between the surface components and downhole components of a rod pumping system for use in an oil field. Sucker rods are elongate members that are conventionally about 25 to 30 ft (about 7 to 9 m) long and include threaded pins at their ends. Sucker rods can be connected to other components by means of a threaded box or other threaded connection engaging a threaded pin, and the rods enable pumping system downhole components to be reciprocated within and easily retrieved from the borehole.

The uppermost rod in a string of sucker rods passing down a borehole is referred to as a polished rod. The polished rod enables an efficient hydraulic seal to be formed around the reciprocating rod string. According to the American Petroleum Institute (hereinafter "API"), a polished rod connection should include a tapered or angled threaded connection between a threaded pin portion of the polished rod and a threaded box. The current practice is that the tapered portion of a polished rod's threads are cut using conventional thread-forming techniques. Additional information about and specific dimensions of polished rod connections may be found in API Specification 11B, $25^{th}$ ed., Jan. 1, 1995 (hereinafter "API 11B"), herein incorporated by reference in its entirety. Also, additional information regarding polished rods and oil well pumps in general may be found in, for example, U.S. Pat. No. 5,769,161, entitled "POLISHED ROD FOR OIL WELL PUMPING," hereby incorporated herein by reference in its entirety.

As is known, tapered threads are used in various other applications. For example, tapered pipe threads are employed in plumbing systems, as specified by, for example, the National Pipe Thread ("NPT") Tapered Thread standard. Other items that may incorporate tapered threads include, for example, certain hydraulic and/or pneumatic fittings.

SUMMARY

In non-limiting embodiments according to the present disclosure, a tapered thread roll is provided. In at least one embodiment, a tapered thread roll may include a cylindrical body and annular rings. In these embodiments, the cylindrical body may include a first end, a second end, and a circumferential surface. Further, in these embodiments, the cylindrical body may define a longitudinal axis. Additionally, in these embodiments, the annular rings may protrude from the circumferential surface and may be adapted to form threads in a workpiece. Moreover, in these embodiments, at least a portion of the annular rings define a line having an angle with respect to the longitudinal axis that is greater than zero degrees.

In non-limiting embodiments according to the present disclosure, a set of tapered thread rolls is provided for use in a thread rolling tool. In at least one embodiment, the set of tapered thread rolls may comprise a first thread roll and a second thread roll. Further, in these embodiments, the first thread roll may comprise a first cylindrical body and a first set of annular rings. Additionally, in these embodiments, the first cylindrical body may comprise an end and a circumferential surface and define a longitudinal axis. Also, in these embodiments, the first set of annular rings may protrude from the circumferential surface of the first body. Moreover, in these embodiments, at least a portion of the first set of annular rings may define a line having an angle with respect to the longitudinal axis that is greater than zero degrees. Further, in these embodiments, the second thread roll may comprise a second cylindrical body and a second set of annular rings. Additionally, in these embodiments, the second cylindrical body may comprise an end and a circumferential surface and define a longitudinal axis. Also, in these embodiments, the second set of annular rings may protrude from the circumferential surface of the second body. Moreover, in these embodiments, at least a portion of the second set of annular rings may define a line having an angle with respect to the longitudinal axis that is greater than zero degrees. Further, in these embodiments, the first set of annular rings and the second set of annular rings may be offset from each other by an offset spacing with respect to a plane when the end the first cylindrical body and the end of the second cylindrical body are aligned along the plane.

In non-limiting embodiments according to the present disclosure, a thread rolling tool is provided. In these embodiments, the thread rolling tool may comprise a body defining an opening and a set of tapered thread rolls rotatably mounted in the body and disposed about and at least partially within the opening. Moreover, in these embodiments, each thread roll may be axially fixed to the body.

In non-limiting embodiments according to the present disclosure, a thread rolling method is provided. In these embodiments, the thread rolling method may comprise the steps of mounting a thread rolling tool in a rotary machine, placing a workpiece in the rotary machine, rotating the thread rolling tool with respect to the workpiece, advancing the workpiece towards the thread rolling tool, stopping the advancement of the workpiece towards the thread rolling tool once a threaded workpiece has been created, and retracting the workpiece away from the thread rolling tool to provide a threaded workpiece. Further, in these embodiments, the thread rolling tool may comprise a body and at least two tapered thread rolls that are axially fixed to the body. Additionally, in these embodiments, the thread rolling tool and the workpiece may be coaxially aligned and may collectively define a longitudinal axis. Also, in these embodiments, the step of advancing the workpiece towards the thread rolling tool may be such that the workpiece contacts the tapered thread rolls. Moreover, in these embodiments, the step of stopping the advancement of the workpiece towards the thread rolling tool may occur after a predetermined portion of the workpiece has been threaded by the tapered thread rolls to provide a threaded workpiece including a tapered thread.

It will be understood that the invention disclosed and described herein is not limited to the embodiments disclosed in this Summary.

BRIEF DESCRIPTION OF THE DRAWINGS

Various characteristics of certain non-limiting embodiments disclosed and described herein may be better understood by reference to the accompanying figures, which are briefly described below.

Figure 1:
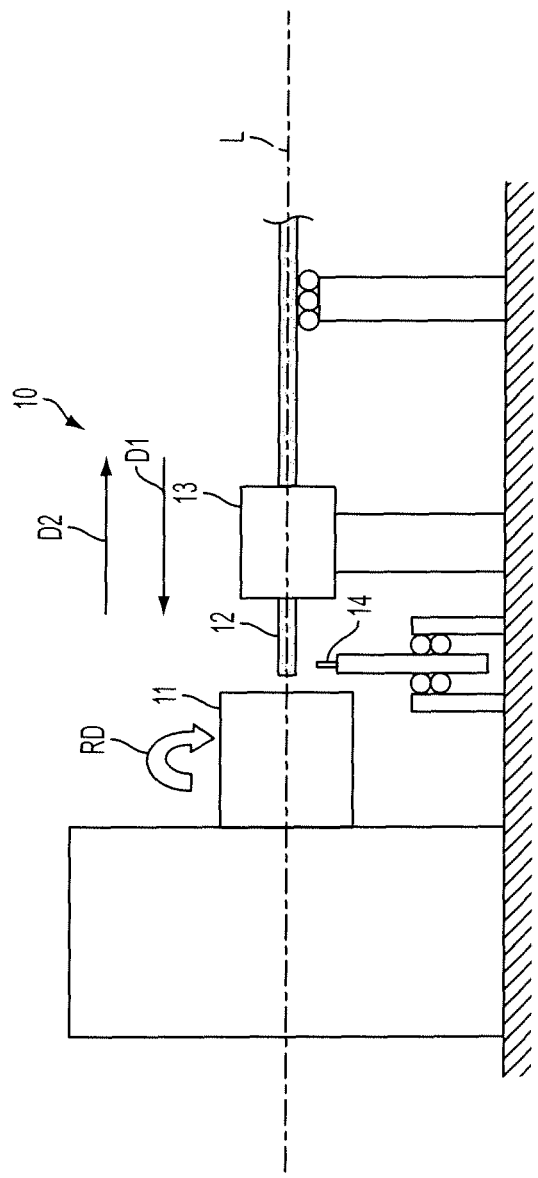
FIG. 1 is a schematic diagram of a rotary machine holding a workpiece and a thread rolling tool according to a non-limiting embodiment of the present disclosure.

The reader will appreciate the foregoing details, as well as others, upon considering the following detailed description of various non-limiting embodiments according to the present disclosure. The reader may also comprehend additional details upon implementing or using embodiments described herein.

DETAILED DESCRIPTION OF NON-LIMITING EMBODIMENTS

It is to be understood that the descriptions of the disclosed embodiments have been simplified to illustrate only those features and characteristics that are relevant to a clear understanding of the disclosed embodiments, while eliminating, for purposes of clarity, other features and characteristics. Persons having ordinary skill in the art, upon considering this description of the disclosed embodiments, will recognize that other features and characteristics may be desirable in a particular implementation or application of the disclosed embodiments. However, because such other features and characteristics may be readily ascertained and implemented by persons having ordinary skill in the art upon considering this description of the disclosed embodiments, and are, therefore, not necessary for a complete understanding of the disclosed embodiments, a description of such features, characteristics, and the like, is not provided herein. As such, it is to be understood that the description set forth herein is merely exemplary and illustrative of the disclosed embodiments and is not intended to limit the scope of the invention defined by the claims.

In the present disclosure, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited herein is intended to include all lower numerical limitations subsumed therein and any minimum numerical limitation recited herein is intended to include all higher numerical limitations subsumed therein. Accordingly, Applicants reserve the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of, for example, 35 U.S.C. §112, first paragraph, and 35 U.S.C. §132(a).

The grammatical articles "one", "a", "an", and "the", as used herein, are intended to include "at least one" or "one or more", unless otherwise indicated. Thus, the articles are used herein to refer to one or more than one (i.e., to "at least one") of the grammatical objects of the article. By way of example, "a component" means one or more components, and thus, possibly, more than one component is contemplated and may be employed or used in an implementation of the described embodiments.

Any patent, publication, or other disclosure material that is said to be incorporated by reference herein, is incorporated herein in its entirety unless otherwise indicated, but only to the extent that the incorporated material does not conflict with existing definitions, statements, or other disclosure material expressly set forth in this description. As such, and to the extent necessary, the express disclosure as set forth herein supersedes any conflicting material incorporated by reference herein. Any material, or portion thereof, that is said to be incorporated by reference herein, but which conflicts with existing definitions, statements, or other disclosure material set forth herein is only incorporated to the extent that no conflict arises between that incorporated material and the existing disclosure material. Applicants reserve the right to amend the present disclosure to expressly recite any subject matter, or portion thereof, incorporated by reference herein.

The present disclosure includes descriptions of various embodiments. It is to be understood that the various embodiments described herein are exemplary, illustrative, and non-limiting. Thus, the present disclosure is not limited by the description of the various exemplary, illustrative, and non-limiting embodiments. Rather, the invention is defined by the claims, which may be amended to recite any features or characteristics expressly or inherently described in or otherwise expressly or inherently supported by the present disclosure. Further, Applicants reserve the right to amend the claims to affirmatively disclaim features or characteristics that may be present in the prior art. Therefore, any such amendments would comply with the requirements of 35 U.S.C. §112, first paragraph, and 35 U.S.C. §132(a). The various embodiments disclosed and described herein can comprise, consist of, or consist essentially of the features and characteristics as variously described herein.

In various embodiments, a thread rolling system and/or tool may be provided which may form threads in a piece of material. Referring to FIG. 1, a schematic diagram is shown of a threading system that may be configured to create threads in a piece of material or workpiece 12 with a thread rolling tool 11. The thread rolling tool 11 and the workpiece 12 may be held in a rotary machine tool 10 in a coaxial relationship, such that the thread rolling tool and the workpiece 12 share the same longitudinal axis "L". The rotary machine tool 10 may hold the thread rolling tool 11 such that the tool 11 may be rotated about the longitudinal axis L in at least one rotational direction "RD." Further, the rotary machine tool 10 may hold the workpiece in a feed device 13 configured to move or translate the workpiece in a first direction "D1" and/or a second direction "D2", towards and away from the thread rolling tool, respectively, for example. Additionally, a turning tool 14 may be moved into contact with the workpiece 12 to create features thereon.

The rotary machine tool 10 may comprise a computer numerical control ("CNC") lathe, such as a Nakamura-Tome TW20 Twin-Spindle, Twin-Turret Horizontal Lathe (manufactured by Nakamura-Tome, Japan), for example. However, the rotary machine 10 may include any one or more of a variety of machines, including, but not limited to, horizontal lathes, vertical machining centers and horizontal machining centers, for example. The rotary machine 10 may include, in general: a spindle, a sub-spindle, and/or a tooling envelop that can accommodate the thread rolling tool 11 required to provide a desired thread size; an allowable tool weight capacity that accommodates the thread rolling tool 11; and sufficient machine horsepower to permit thread rolling on the workpiece 12. In at least one embodiment, the rotary machine 10 may also be adapted to provide a threading cycle whereby the feed rate or pitch is synchronized with the spindle speed. In other words, the axes of both the workpiece 12 and the thread rolling tool 11 may be tuned to each other, and the rotary machine 10 may include a rigid tapping and/or synchronous CNC tapping capability for a "thread on/thread off" cycle. In general, the rotary machine 10 may be configured to spin the thread rolling tool 11 and/or the workpiece 12 about the longitudinal axis L while moving one or more of the tool 11 and/or the workpiece 12 into and out of contact with each other such that threads are rolled onto the workpiece 12, as described in more detail below.

Figure 2:
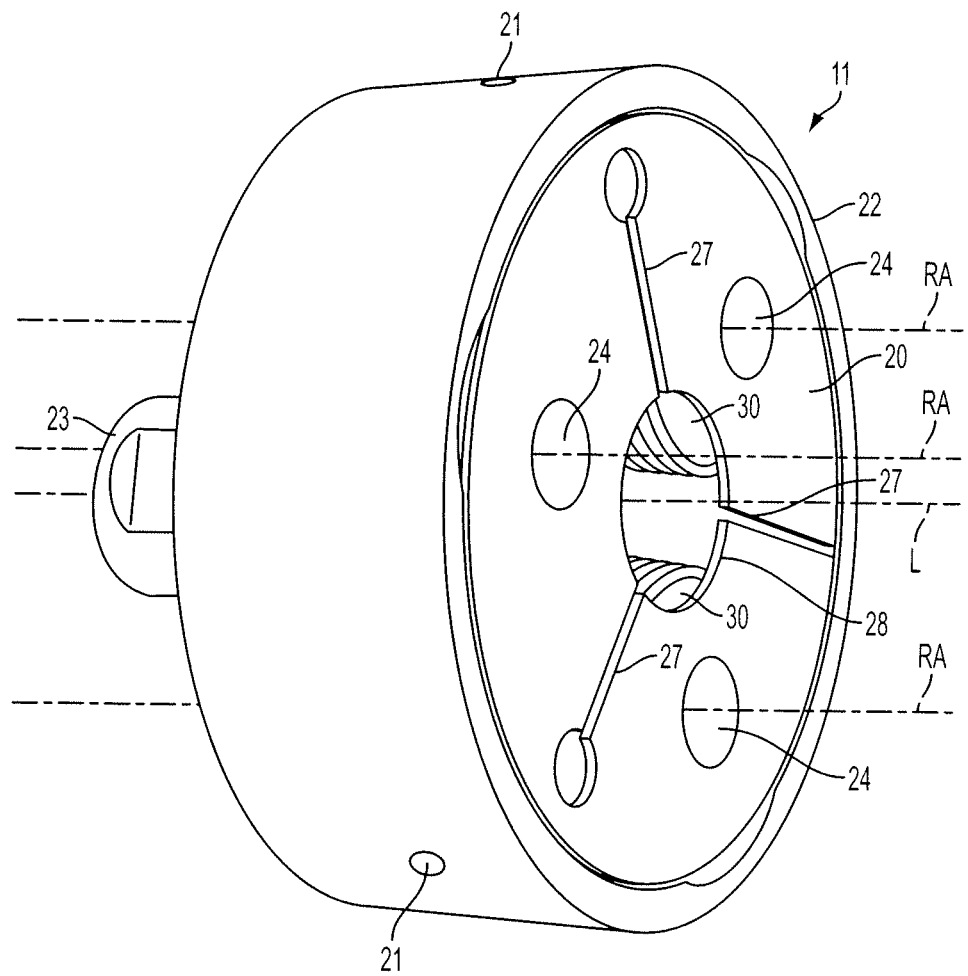
FIG. 2 is a perspective view of a thread rolling tool according to a non-limiting embodiment of the present disclosure.
Figure 3:
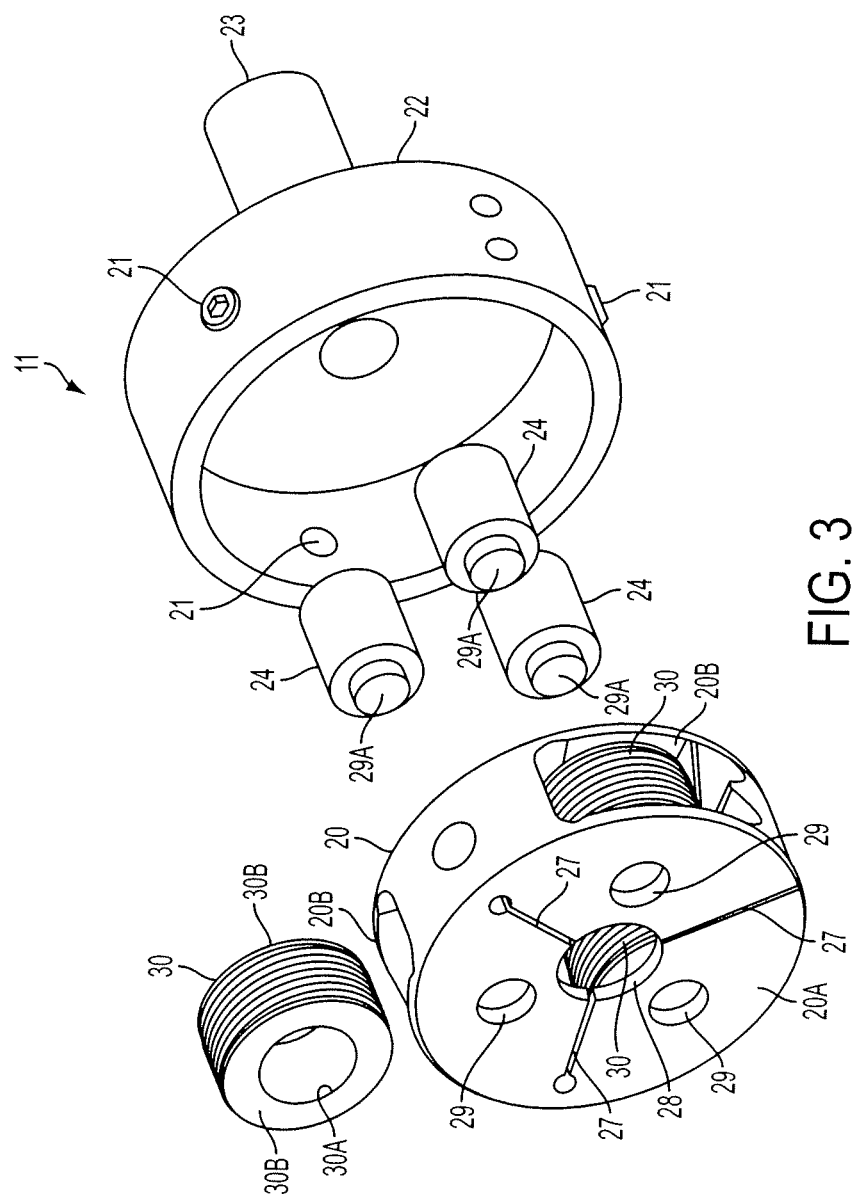
FIG. 3 is a partially exploded view of the thread rolling tool of FIG. 2.
Figure 4:
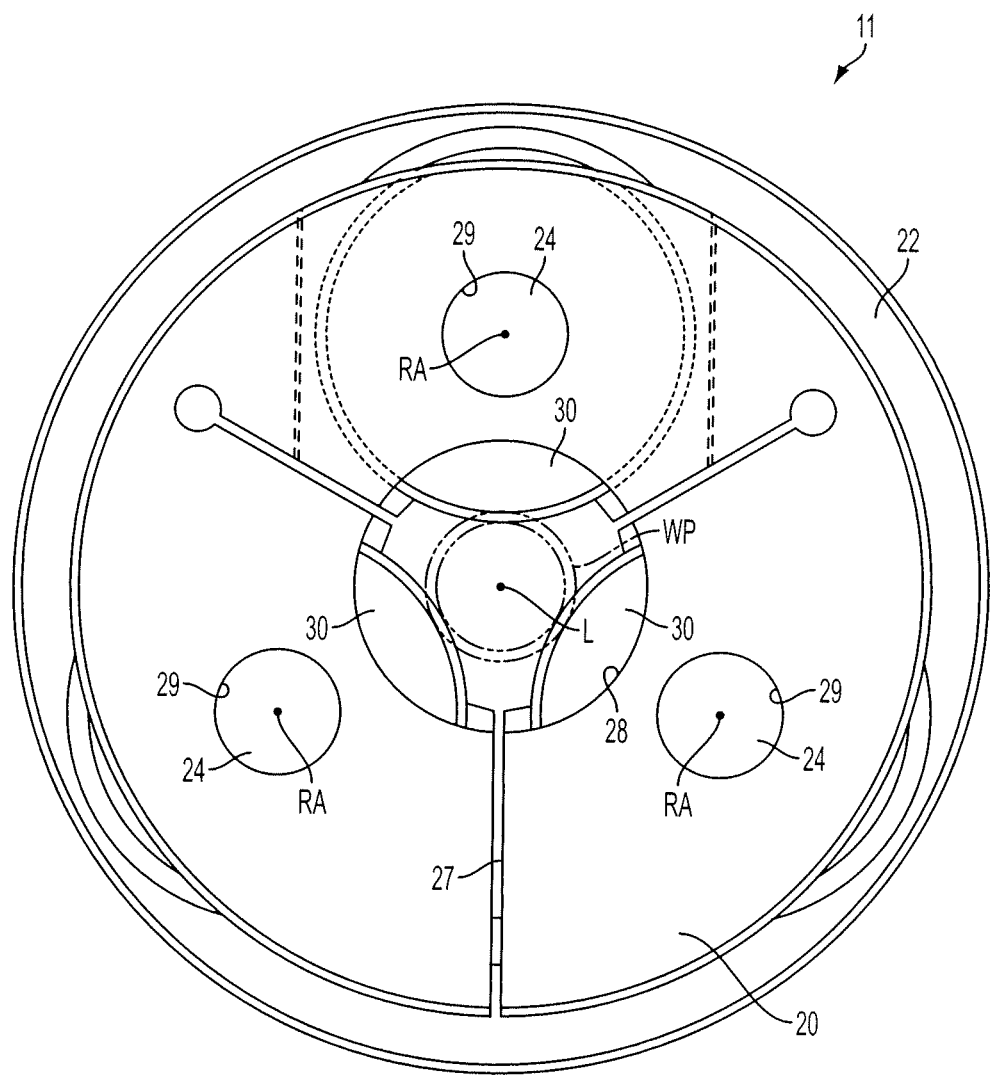
FIG. 4 is a front view of the thread rolling tool of FIG. 2.
Figure 5:
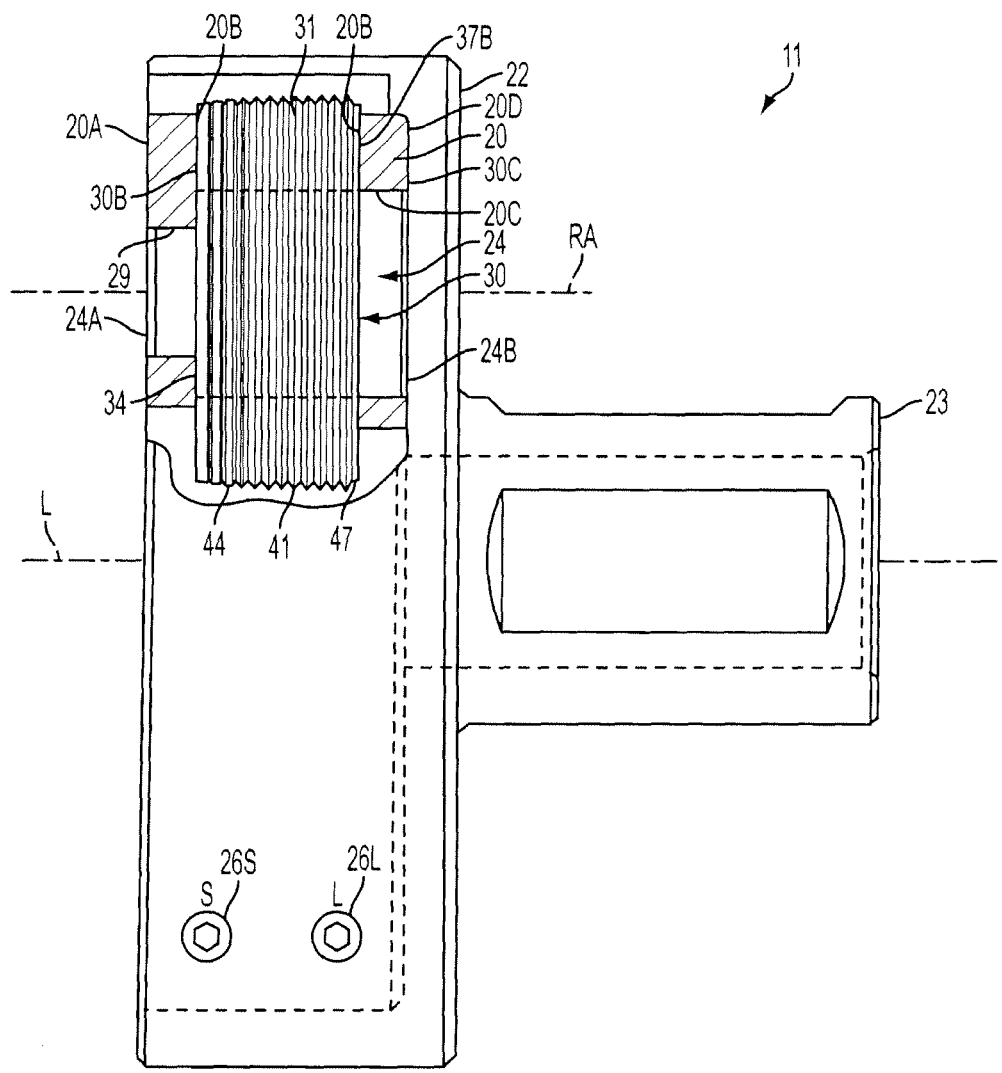
FIG. 5 is a side view of the thread rolling tool of FIG. 2 (a portion of an outer wall of the thread rolling tool is cut away to show a thread roll and other features within the tool).

According to at least one non-limiting embodiment, referring now to FIGS. 2-5, various views of a thread rolling tool 11 are shown. FIG. 2 is a perspective view of the thread rolling tool 11. FIG. 3 is a partially exploded view of the thread rolling tool 11. FIG. 4 is a front view of the thread rolling tool 11. FIG. 5 is a side view of the thread rolling tool of FIG. 2, with a portion of the thread rolling tool cut away to reveal features therein, such as a thread roll 31, for example, discussed in more detail below. The thread rolling tool 11 may include a mounting shaft 23 that is configured to be rotatably or fixedly mounted to a rotary machine, such as rotary machine 10 described above (see FIG. 1). The mounting shaft 23 may be sized and configured to be mounted in a standard tool holder of the rotary machine 10. The thread rolling tool 11 may further comprise a die holder 22 sized and configured to receive a die body 20 therein. The die body 20 may be made of an alloy steel, for example. Further, the die body 20 may be removably secured to the die holder 22 by retaining screws 21, for example. Additionally, the die body 20 may define an opening 28 through which a workpiece, such as workpiece 12 described above (see FIG. 1), may be inserted. As shown in FIG. 4, for example, a workpiece insertion area "WP" is shown in dashed lines. The tool 11 may further comprise a set of tapered thread rolls 30 rotatably mounted in the body and disposed about and at least partially within the opening such that at least one of the thread rolls 30 may contact a workpiece inserted through the opening 28, such as one within the workpiece area WP. Moreover, each thread roll 30 may be axially fixed to the die body 20. In at least one embodiment, each thread roll 30 may define an inner bore 30A which may be journaled on roll shafts 24. The roll shafts 24 may be subsequently received in mating holes 29 in the die body 20. In other words, the thread rolls 30 may be axially fixed about their respective roll axes "RA" to the die body 20, for example, such that the roll axis RA of each thread roll 30 may not translate with respect to a longitudinal axis "L" defined by the thread rolling tool 11 and/or die body 20. Further, in at least one embodiment, each thread roll 30 may also rotate about its respective roll shaft 24 and/or each roll shaft 24 may rotate within the die body 20 such that each roll 30 rotates about its respective roll axis RA.

Moreover, in at least one embodiment, the tapered thread rolls 30 may also be supported at both ends, that is, at each thread roll's front face 30B and at each thread roll's back face 30C. Referring briefly to FIG. 5, the front face 30B may be supported by a back portion of a die body slot 20B (described in more detail below), and the back face 30C may be supported by a front portion of the slot 20B. Also, a front portion 24A of each roll shaft 24 may be supported by a respective mating hole 29, and a back face 24B of each roll shaft 24 likewise may be supported by a receiving hole 20C positioned at a rear portion 20D of the die body 20. Providing support at both ends of the thread rolls 30 in this way may provide enhanced axial precision and/or accuracy when rolling threads.

With respect to at least one embodiment, referring to FIGS. 3-5, the set of three tapered thread rolls 30 are shown mounted on roll shafts 24. The roll shafts 24 may be made from carbide, for example. As seen in FIG. 5, each carbide roll shaft 24 may support one of the three thread rolls 30. Each carbide roll shaft 24 may have a reduced diameter on its respective front portion 24A, which may include a diameter that allows for a light press fit installation into its respective mating hole 29 in the front face 20A of the die body 20. The primary diameter of the back face 24B of each carbide roll shaft 24 may be sized and configured to fit through the bore 30A of each thread roll 30. Further, the fit between the shaft's back portion 24B and the roll's bore 30A may be a "high class fit" that facilitates smooth rotation of the thread roll 30. This high class fit between the bore 30A of the thread roll 30 and the roll shaft 24 may be helpful to minimize deflection during the thread rolling process. This feature may help ensure that any tapered or angled threads are accurately roll-formed onto a workpiece.

In at least one embodiment, referring to FIGS. 3-5, the die body 20 may be machined with three recesses or slots 20B positioned 120° from each other about the radial centerline or longitudinal axis L of the die body 20. The width of these slots may be deliberately machined with a controlled amount of clearance over the width of the thread rolls 30. This clearance may allow the thread rolls 30 to axially float or "track" in order to stay in pitch as a thread is rolled. As seen in FIG. 5, the front and back surfaces of slots 20B may be perpendicular to the axial centerline or longitudinal axis L of the die body 20. Additionally, in at least one embodiment, the roll axis RA of each thread roll 30 may be pivoted about a vertical axis (when the tool 11 is mounted in a rotary machine 10, see FIG. 1, for example), by about 0.5° to about 8° to establish the proper helical shape formation of a thread lead rolled into a workpiece. Also, while the set of thread rolls 30 in the thread rolling tool 11 may comprise three thread rolls as shown, a thread rolling tool according to the present disclosure may comprise a different number of thread rolls. For example, in at least one embodiment, a thread rolling tool according to the present disclosure may comprise two thread rolls oriented 180° about the tool's longitudinal axis. In such an embodiment, the thread rolling tool and workpiece may both rotate in a rotary machine utilizing a controlled feed rate. However, in the illustrated embodiment of the thread rolling tool 11, which includes a set of three thread rolls 30 disposed at 120° intervals about the longitudinal axis L, the relative positions of the thread rolls 30 may provide the inherent stability of an equilateral triangle. Such an arrangement may capture a workpiece at the center of the thread rolling tool 11, between the thread rolls 30 and along axis L. Further, in at least one embodiment according to the present disclosure, a thread rolling tool may comprise a set of more than three thread rolls, such as four or five thread rolls, for example, disposed about the thread rolling tool's longitudinal axis.

The die body 20 may include a predetermined center distance, defined by the workpiece area "WP", for example (see FIG. 4), which governs the position of the set of thread rolls 30 relative to the workpiece. This center distance and the specified diameters of the threads to be rolled on the workpiece, as set forth by the API 11B standard, for example, may help determine the working diameter of the thread rolls 30. Additionally, the relative position of the thread rolls 30 may be adjusted by adjusting screws 26S and 26L as described below (see FIG. 5). Minor adjustments for thread size may be accomplished through the opposing size adjusting screws 26S (identified by the letter "S" for "smaller") and 26L (identified by the letter "L" for "larger") as shown in FIG. 5. The process of releasing the "L" size adjusting screw 26L and tightening the "S" size adjusting screw 26S may take-up the spring-like action created by die body 20, which may comprise a heat treated material and one or more gaps 27 formed therein to allow the die body 20 to be circumferentially adjusted. Adjusting screws 26L and 26S in this way may reduce the size of a "thread circle" defined by the set of three thread rolls 30. Reversing the procedure, by releasing the "S" size adjusting screw 26S and tightening the "L" size adjusting screw 26L, may take-up the die body 20 material's spring action in the opposite direction, thereby spreading the die body 20 at the gaps 27 and, in effect, increasing the size of the thread circle defined by the set of three thread rolls 30. Following each adjustment for size, all screws, such as retaining screws 21 and size adjusting screws 26S, 26L, may be thoroughly tightened.

In at least one non-limiting embodiment, various components of the thread rolling tool 11, such as the die holder 22, the die body 20, the roll shafts 24, the retaining screws 21, and/or the size adjusting screws 26S, 26L, for example, may comprise one or more components of a CNC "SR"-type EZ ROLLER™ thread rolling tool, manufactured by Landis Threading Systems, Waynesboro, Pa. In certain non-limiting embodiments, for example, the foregoing components may be components of a #10 EZ ROLLER™ thread rolling tool or another axial-style, non-opening thread rolling tool. If, for example, the thread rolling tool 11 is sized similar to a #10 EZ ROLLER™ thread rolling tool, the workpiece area WP (see FIG. 4) may be between about $^{15}/_{16}$ inches and about 1$^{9}/_{16}$ inches. Coincidentally, this workpiece area range may correlate to the outer diameter of a "pin" region of a polished rod as specified by the API 11B standard, for example. In any event, a non-opening thread rolling tool, such as an EZ ROLLER™ thread rolling tool, for example, utilizing tapered thread rolls 30 may provide proper rolling and/or formation of tapered or angled threads on a workpiece.

Figure 6:
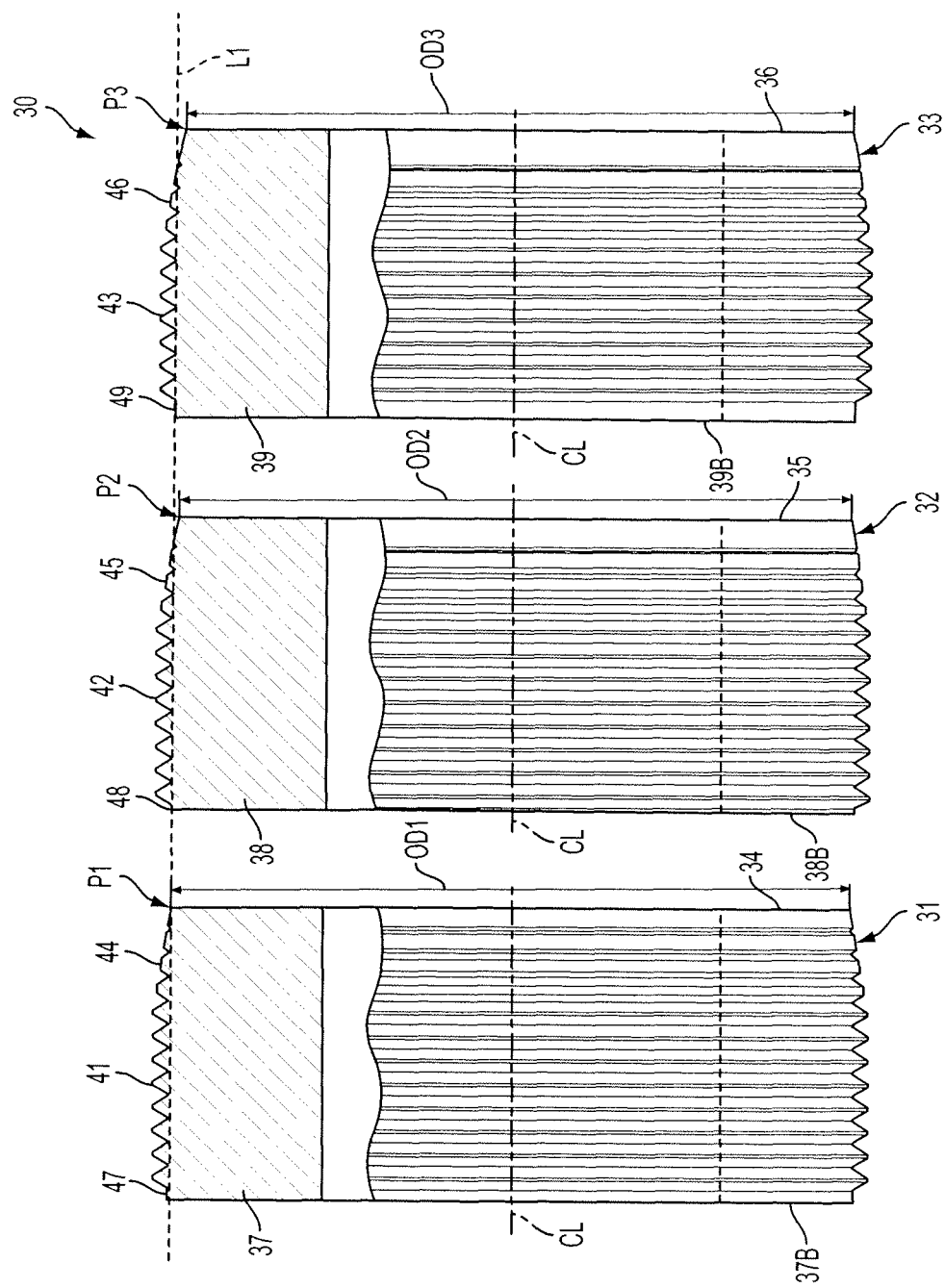
FIG. 6 is a side view of a set of three thread rolls of the thread rolling tool of FIG. 2, with the thread rolls coaxially aligned.

In various embodiments, referring to FIG. 6, a set of tapered thread rolls, such as set 30, for example, may comprise first thread roll 31, second thread roll 32, and third thread roll 33. FIG. 6 illustrates a side view of the three thread rolls 31, 32, and 33 oriented coaxially aligned along a common axis or centerline "CL." Each tapered thread roll 31, 32, and 33 may comprise a cylindrical body 37, 38, and 39, respectively. Each cylindrical body 37, 38, 39 may comprise a first end, such as that defined by front faces 34, 35, and 36, respectively, and a second end, such as that defined by back faces 37B, 38B, and 39B, respectively. Further, each body 37, 38, 39 may define a longitudinal axis, such as axis CL shown in FIG. 6, for example. Moreover, each thread roll 31, 32, 33 may further comprise protruding annular rings 41, 42, and 43, respectively. At least a portion of the annular rings 41, 42, 43, such as, for example, angled portions 44, 45, and 46, respectively, may define a line having an angle with respect to the longitudinal axis CL that is greater than zero degrees. In other words, in at least one embodiment, each set of annular rings 41, 42, and 43 may comprise an angled portion 44, 45, and 46 and a straight or non-angled portion adjacent to the angled portion. Alternatively, in at least one embodiment (not shown), each annular ring set may comprise only an angled portion.

Figure 7:
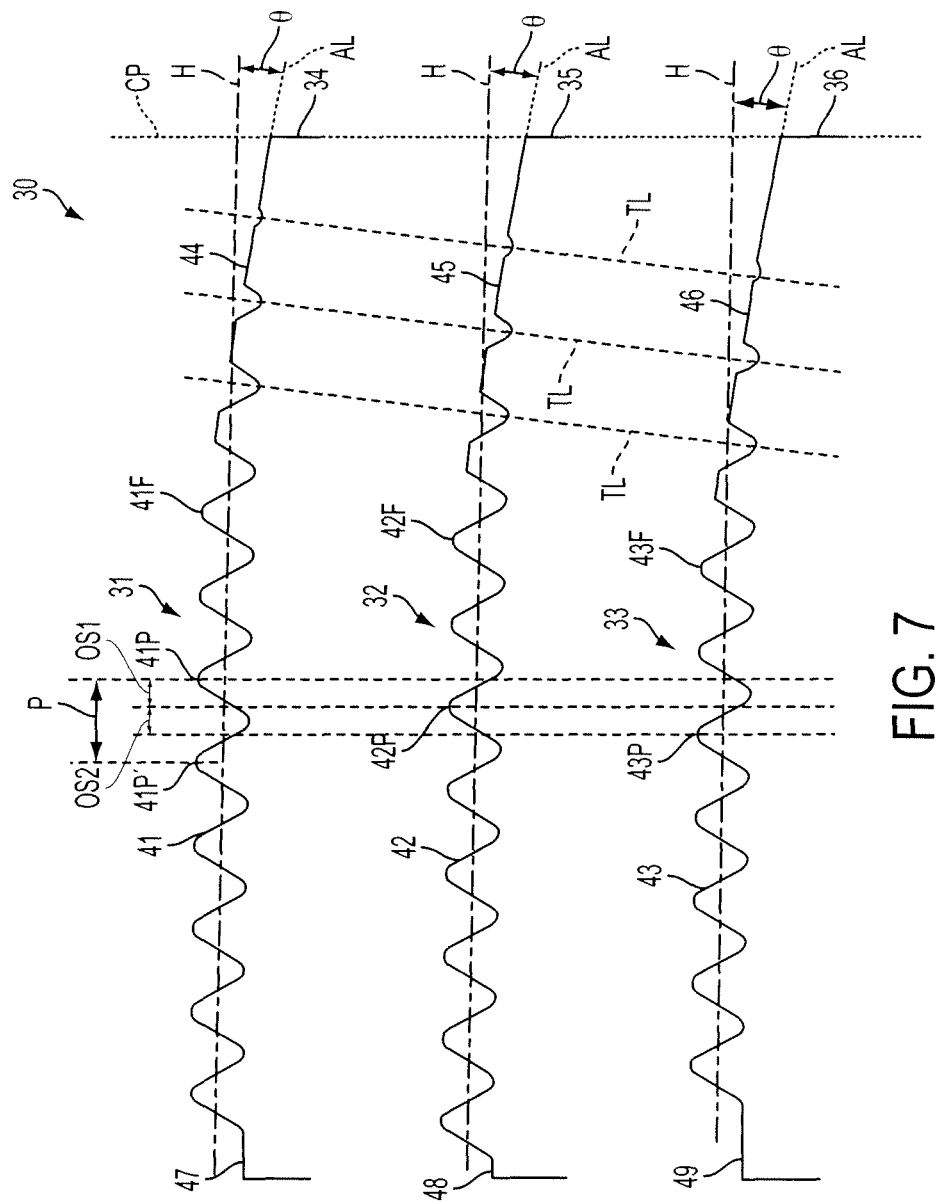
FIG. 7 shows the annular ring profiles of the three thread rolls of FIG. 6, with a face of each thread roll aligned along a common plane.

In order to show more detail, FIG. 7 illustrates a profile of a top portion of the three tapered thread rolls 30 with a front face 34, 35, 36 of each thread roll 31, 32, 33, respectively, positioned in a common plane "CP". The angled portions 44, 45, and 46 of the annular rings 41, 42, and 43 can each be seen defining an angled line "AL" that defines a cone angle "θ" with respect to a "horizontal" line "H," which is parallel to the longitudinal axis CL seen in FIG. 6, for example. In at least one embodiment, the cone angle θ may be about 9°, as specified in the API 11B standard, referenced above. Additionally, in at least one embodiment, the angled portions 44, 45, and 46 may each comprise four portions of annular rings that define the angled lines AL. Further, in at least one embodiment, the angled portions 44, 45, and 46 may be adapted to form a desired tapered thread portion of a polished rod, as specified by the API 11B standard, for example, thereby providing a corresponding controlled taper on a polished rod workpiece, as discussed in greater detail below.

As can be seen in FIG. 7, the annular rings 41, 42, 43 of the tapered thread rolls 31, 32, 33 may be offset from each other by an offset spacing, such as first offset spacing "OS1" and/or second offset spacing "OS2", for example, with respect to the common plane CP when the front faces 34, 35, and 36 are aligned to lie in the common plane CP. The offset spacings OS1, OS2 may be defined as the distance between corresponding peaks 41P, 42P, and 43P of the annular rings 41, 42, and 43, respectively, when the thread rolls 31, 32, 33 are so aligned. Referring briefly to FIG. 4, the appropriate offset spacing may be determined by the relative positioning of the thread rolls 30 about the opening 28 and with respect to each other. As illustrated in FIG. 4, the thread rolls 30 are positioned equidistant from the thread rolling tool's longitudinal axis L at 120° relative positions about the axis L. Accordingly, the offset spacing should be such that a continuous thread being rolled onto a workpiece by the thread rolls 30 may be properly helically shaped so as to follow a thread lead "TL" as shown in FIG. 7. Because FIG. 7 shows the profile of the annular rings 41, 42, and 43 laid out in planar form and oriented for the purposes of clarity, the thread lead TL is shown as a straight line, while the final thread formed on a workpiece would actually have a three-dimensional, helical shape.

Referring to FIG. 7, in at least one embodiment, the offset spacings OS1 and OS2 may be equivalent and equal to ⅓ of the pitch distance "P." The pitch distance P may be defined as the distance between two adjacent peaks, such as 41P and 41P', for example, of the annular rings, such as annular rings 41, for example. Further, in embodiments including a number "N" of thread rolls, the offset spacing may be equal to 1/N of the pitch distance. Thus, as shown in FIG. 7, where the set of thread rolls 30 includes three threads rolls, such as rolls 31, 32, and 33, for example, N equals three and the offset spacing may be equal to 1/N, or ⅓, of the pitch distance P.

In at least one non-limiting embodiment, the set of three thread rolls 30 shown in FIG. 6 and shown partially in FIG. 7 may be configured such that the thread position of annular rings 41, 42, 43 on each individual thread roll 31, 32, 33 may include the offset spacing(s) as discussed above. In other words, the rings 41, 42, 43 may be stepped ⅓ of the pitch distance P axially from each other. In at least one embodiment, FIGS. 6 and 7 also illustrate the offset spacing by the difference seen in the visible amount of land 47, 48, and 49 adjacent to the last full annular ring 41, 42, 43 on each individual thread roll 31, 32, 33, respectively, for example. Therefore, the extent of land 49 visible on the third thread roll 33 is greater than the extent of land 48 visible on the second thread roll 32. Further, the extent of land 47 on the first thread roll 31 is the average between the second roll's land 48 and the third roll's land 49. Additionally, the face 34, 35, 36 of each individual thread roll 31, 32, 33 may be precisely machined to ensure the accurate position of the annular rings 41, 42, and 43 as they are machined on each thread roll 31, 32, and 33, respectively. Thus, referring to FIG. 4, as the set of three thread rolls 30 make one revolution around a workpiece in the workpiece area WP, the rolls 31, 32, 33 "track" or stay in pitch, as dictated by the geometry of the desired thread lead TL (see FIG. 7) to be rolled in a workpiece. The ⅓ pitch offset spacing may be precisely machined into the set of three thread rolls 30. Also, the 9° cone angle θ on each individual thread roll's angled portion 44, 45, 46 may also be precisely machined to a specific diametrical starting position, for example.

In at least one embodiment, referring to FIG. 6, the specific diametrical starting position of each thread roll 31, 32, 33, may be configured to match a desired thread lead. In other words, the first thread roll's 31 cylindrical body 37 may define a first outer diameter "OD1" at the first roll's first end or front face 34, the second thread roll's 32 cylindrical body 38 may define a second outer diameter "OD2" at the second roll's end or front face 35, and the third thread roll's 33 cylindrical body 39 may define a third outer diameter "OD3" at the third roll's end or front face 36. As can be seen in FIG. 6, which shows the thread rolls 31, 32, 33 coaxially aligned along axis CL, the first outer diameter OD1 is larger than the second outer diameter OD2, and the second outer diameter OD2 is larger than the third outer diameter OD3. The outer diameter differences can be seen by evaluating their relative position to reference line "L1", which is drawn parallel to the axis CL. Notably, point P1 on the first outer diameter OD1 lies along the reference line L1, point P2 on the second outer diameter OD2 lies relatively below the reference line L1, and point P3 on the third outer diameter lies relatively below the reference line L1 and below the relative position of point P2. Accordingly, referring to FIG. 4, when a workpiece enters the workpiece area WP, and the thread rolling tool 11 is rotated relative to the workpiece and/or the workpiece is rotated relative to the thread rolling tool 11, the diametric starting position of the first thread roll 31, defined by the first outer diameter OD1, may cause the first thread roll 31 to contact and begin to roll a thread lead on the workpiece ⅓ of a pitch distance before the other thread rolls 32, 33 begin to do the same. Then, in sequence, the second thread roll 32 may contact and continue to roll the thread line in the workpiece ⅓ of a pitch distance further along the workpiece than the relative thread position of the first thread roll 31 with respect to the workpiece. Finally, in sequence, the third thread roll 33 may then contact and continue to roll the thread line ⅓ of a pitch distance further along the workpiece than the relative thread position of the second thread roll 32 with respect to the workpiece. As will be appreciated, referring briefly to FIG. 1, the relative rotational speed of the thread rolling tool 11 with respect to the workpiece 12, and the feed rate of the feed device 13 in the first and/or second directions D1, D2, may need to be closely matched such that the thread lead is properly formed in the workpiece 12.

Figure 8:
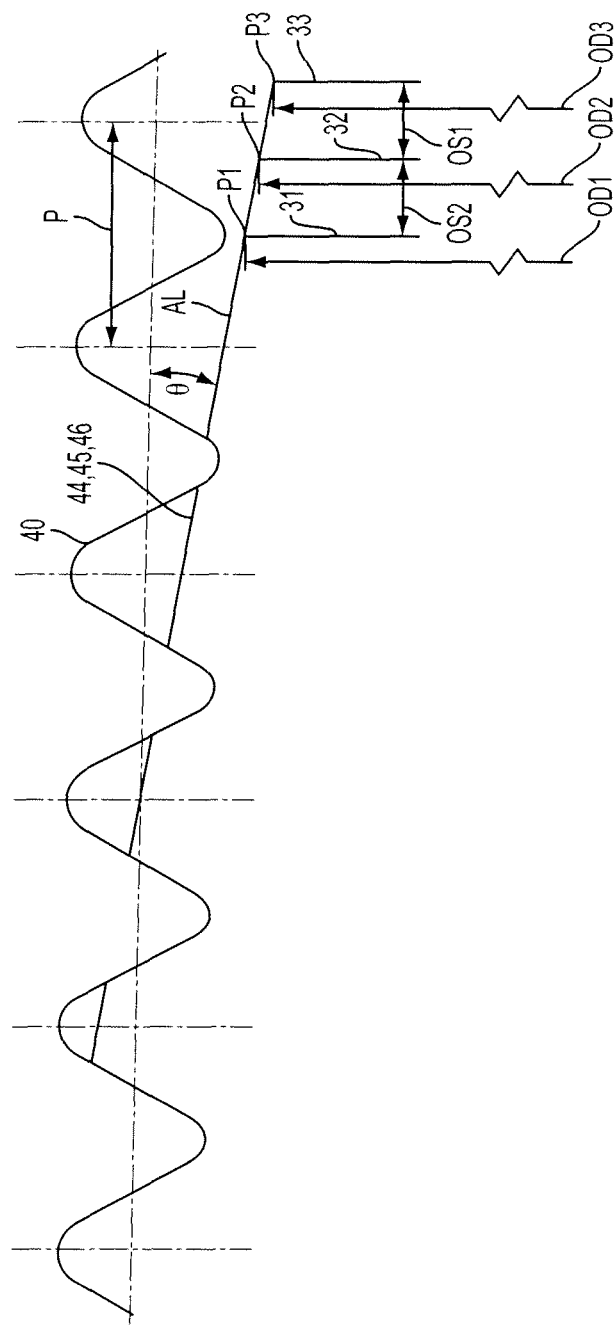
FIG. 8 is a profile of a set of annular rings with relative starting offset positions of the three thread rolls of FIG. 6 overlaid.

In at least one embodiment, the determination of the proper annular ring profile for each thread roll may be set forth as follows. Referring to FIG. 8, a profile of a set of non-angled annular rings 40 are shown with the relative starting offset positions of the three thread rolls 31, 32, 33 overlaid. The angled line AL is shown matching each of the thread roll's 31, 32, 33 profiles. Accordingly, the above-referenced different annular ring and cylindrical body profiles resultant from offset spacing OS1, OS2 and outer diameters OD1, OD2, OD3 can be appreciated. Additionally, in certain embodiments the thread rolls may be made from a hardened steel, such as tool steel, high speed steel, and/or HYPERROL® alloy (sold by Landis Threading Systems, Waynesboro, Pa.), for example. The tapered thread rolls may be manufactured by a variety of methods. For example, the thread rolls may be made by a multi-rib grinding process or a single-rib grinding process.

While the above has contemplated a plurality of thread rolls having an offset configuration, in at least one embodiment (not illustrated), a set of identical tapered thread rolls may be provided. In such an embodiment, a die body may be configured to hold the thread rolls at the above-referenced offset spacing, along the die body's centerline and with respect to each other, such that the desired thread lead may be properly formed in a workpiece. In other words, the N thread rolls may be stepped or positioned at 1/N of a pitch distance axially apart from each other with respect to the die body's face or a plane defined thereby.

Figure 9:
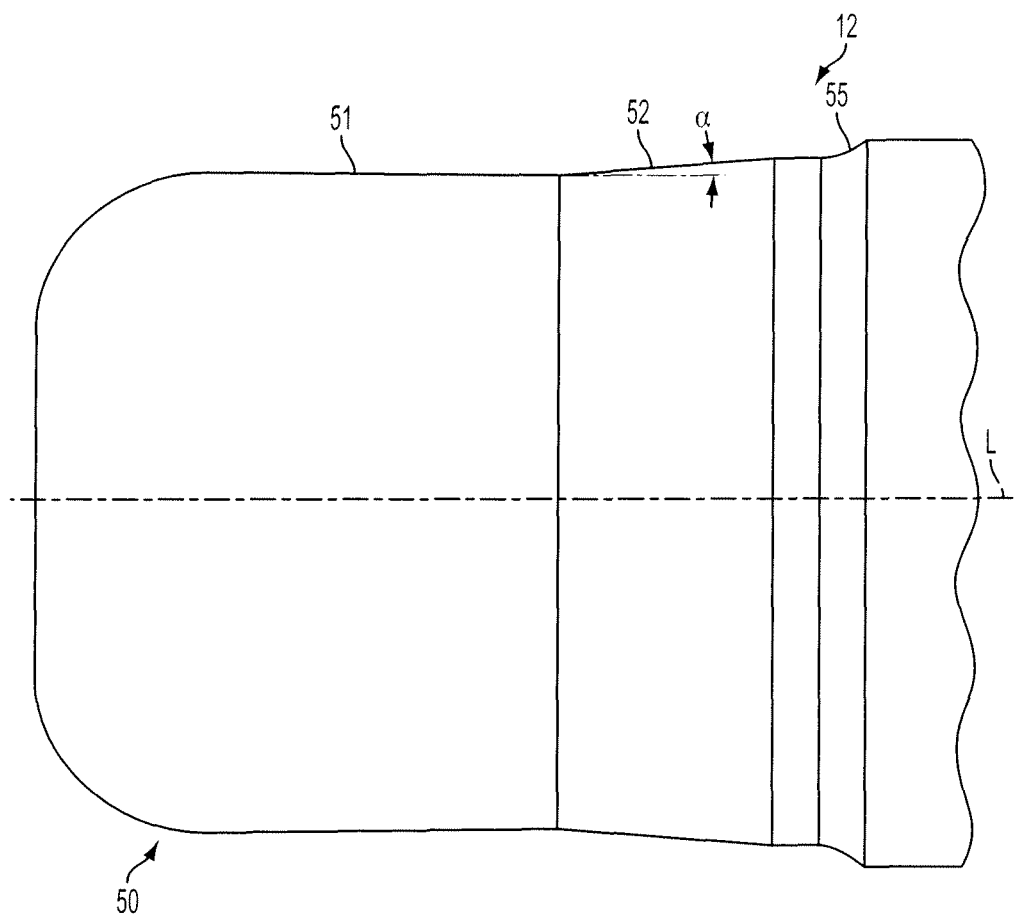
FIG. 9 is a side view of a polished rod workpiece before being threaded according to a non-limiting embodiment.

In at least one embodiment, a workpiece, such as workpiece 12 shown in FIG. 9, may be provided. The workpiece 12 may be formed such that it includes various features, such as a pin 50 including an un-ramped portion 51, a ramped portion 52, and a shoulder portion 55, for example. These and other features may be sized and configured per the polished rod API 11B standard discussed above, for example. Further, as also mentioned above, the foregoing features may be created by a turning tool 14 of the rotary machine 10. In such embodiments, the workpiece may be turned along the workpiece's longitudinal axis L to include the foregoing features. Then, after creating these features, threads may be rolled onto the portions 51 and 52, without removing the workpiece 12 from the rotary machine 10 and such that the workpiece 12 and the thread forming tool 11 remain along the same axis L, thereby helping to ensure that precision between the workpiece's features 51, 52, and 55, and the threads, once formed, is maintained. So that the ramped portion 52 properly includes threads corresponding to the angled portions 44, 45, 46, a ramp angle α, defined by the ramped portion 50 relative to the axis L, may be smaller than the cone angle θ of the thread rolls 31, 32, 33 (see FIG. 7). For example, the ramp angle α may be approximately 5°, which is less than the cone angle θ of approximately 9° discussed above. In any event, the ramp angle α should be sized relative to the cone angle θ such that when a first full annular ring 41F, 42F, 43F (see FIG. 7) of at least one thread roll 31, 32, 33 reaches the ramped portion 52, sufficient material has been rolled into the angled portions 44, 45, 46 to properly create tapered or angled threads therein. The ramp angle α may be chosen such that the space between the annular rings 41, 42, 43 of the angled portions 44, 45, 46 are not overfilled by the workpiece's material when the workpiece 12 is rolled by the thread rolls 31, 32, 33.

Figure 10:
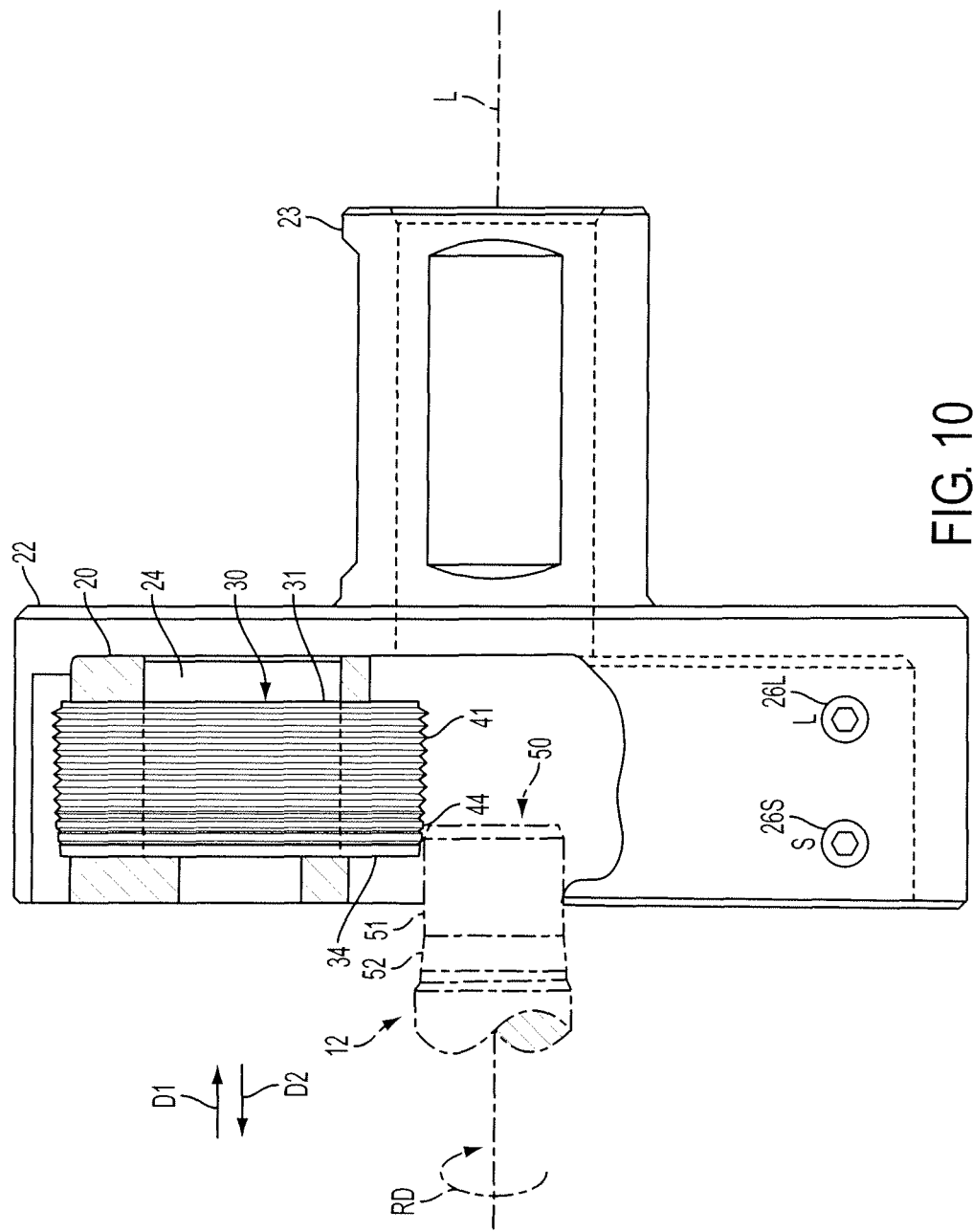
FIG. 10 is a side view of the thread rolling tool of FIG. 2 with a polished rod workpiece advancing toward a thread roll (portions of the thread rolling tool have been cut away to reveal internal features).
Figure 11:
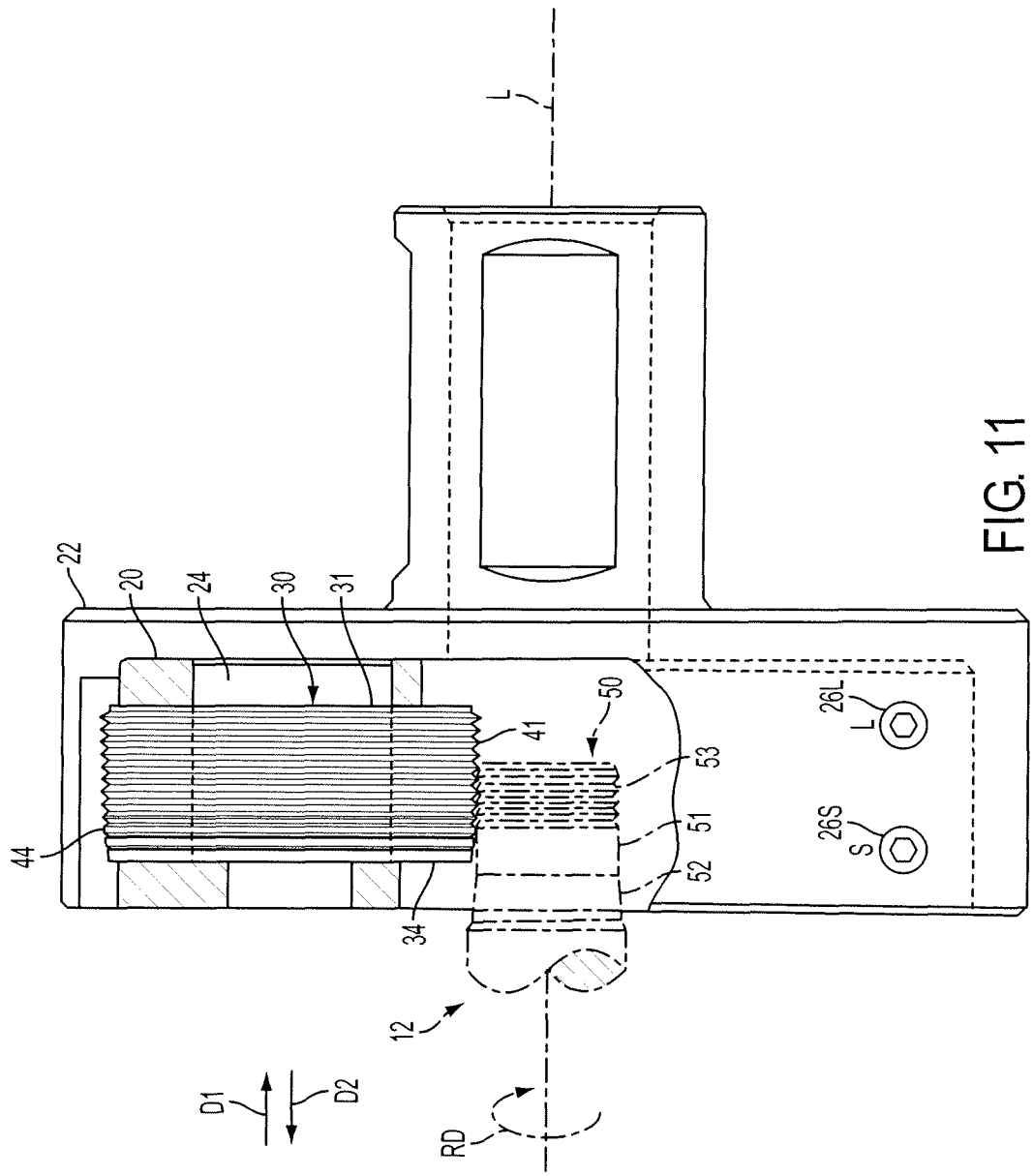
FIG. 11 is a side view of the thread rolling tool of FIG. 10 with the polished rod workpiece advanced such that the thread roll partially engages the workpiece (portions of the thread rolling tool have been cut away to reveal internal features).
Figure 12:
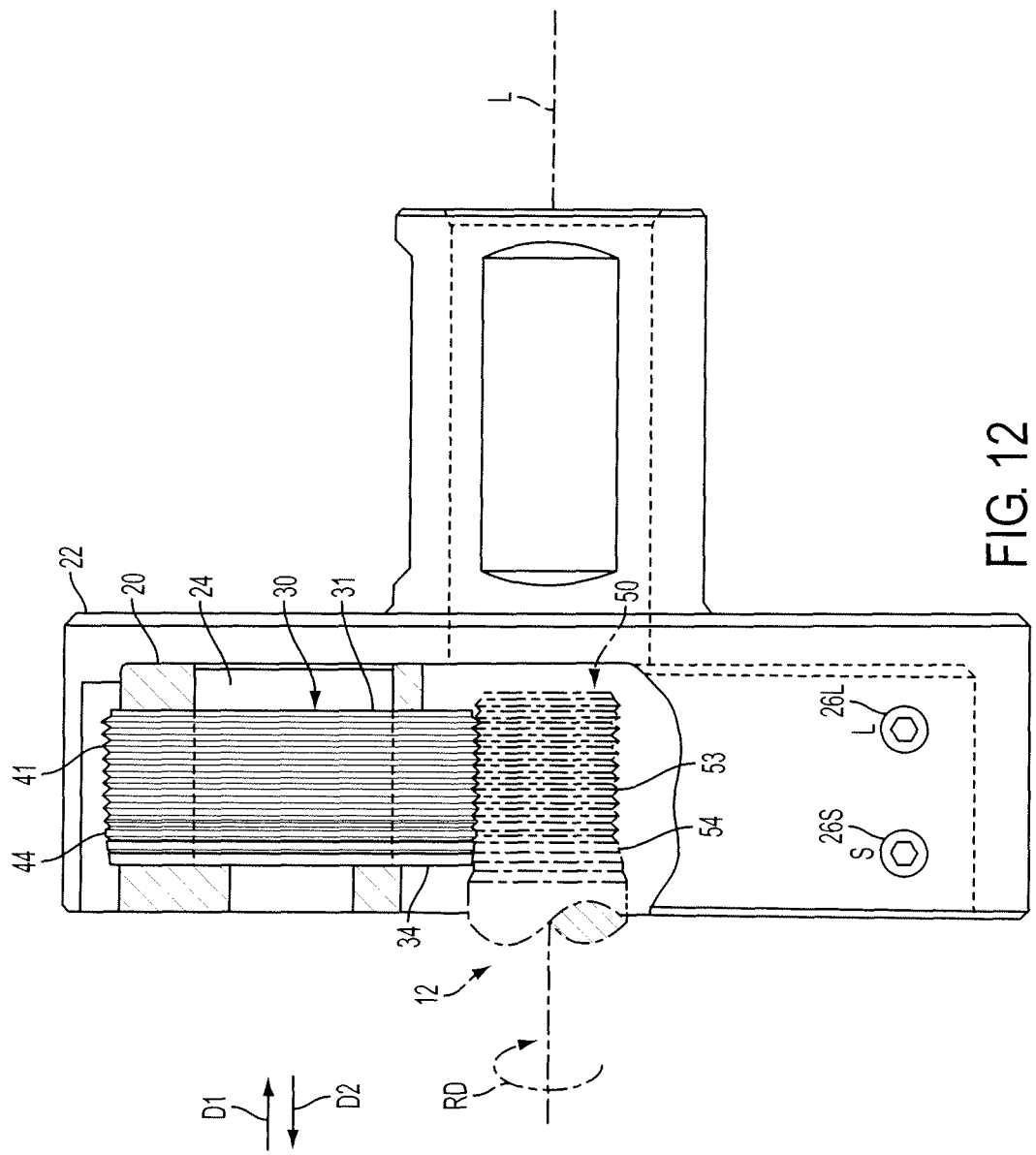
FIG. 12 is a side view of the thread rolling tool of FIG. 10 with the polished rod workpiece advanced such that the thread roll fully engages the workpiece (portions of the thread rolling tool have been cut away to reveal internal features).
Figure 13:
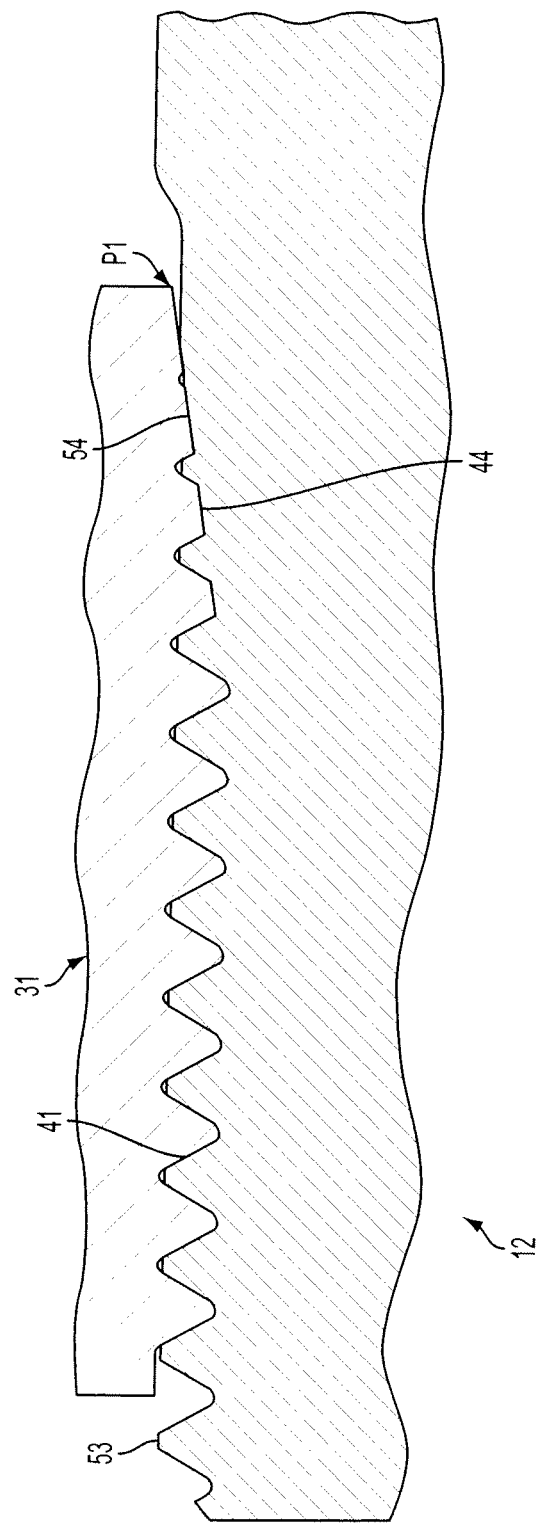
FIG. 13 is a side cross-sectional view of a portion of the thread roll of FIG. 12 fully engaging the polished rod workpiece.

FIGS. 10-13 illustrate an example of a workpiece 12 advancing into the thread forming tool 11 such that threads are formed on the workpiece 12 by the set of thread rolls 30. FIG. 10 is a side view of the thread rolling tool 11 with a polished rod workpiece 12 shown advancing toward a thread roll 31. FIG. 11 is a side view of the thread rolling tool 11 with the polished rod workpiece 12 further advancing so that the thread roll 31 partially engages the workpiece 12. FIG. 12 is a side view of the thread rolling tool 11 with the polished rod workpiece 12 further advanced so that the thread roll 31 fully engages the workpiece 12. FIG. 13 is a side cross-sectional view of a portion of the thread roll 31 shown in FIG. 12 fully engaged with the outer circumference of the polished rod workpiece 12 and at a time just prior to the reversal of the rotary machine's spindle to thread-off the workpiece. In FIGS. 10-12, portions of the thread rolling tool 11 have been cut away to reveal further features therein, for clarity.

In at least one embodiment, threads may be rolled on to the workpiece 12 as follows. Referring to FIG. 1, a thread rolling tool, such as tool 11 described above, may be mounted in a rotary machine 10. A workpiece, such as workpiece 12 described above (see FIG. 9), may also be placed in the rotary machine 12 such that the thread rolling tool 11 and the workpiece 12 are coaxially aligned. The thread rolling tool 11 and/or the workpiece 12 may then be rotated, in a rotational direction RD, for example, by the rotary machine 10 such that the thread rolling tool 11 rotates with respect to the workpiece 12. Then, the workpiece 12 and/or thread rolling tool 11 may be translated relative to each other, in first or second directions D1, D2 such that pin 50 of the workpiece 12, for example, advances towards the thread rolling tool 11 (see FIG. 10) and the workpiece 12 contacts the tapered thread rolls 30 of the tool 11 (see FIG. 11) such that threads 53 are rolled and/or formed on the workpiece 12 on non-ramped portion 51. Thereafter, the rotary machine 10 may continue to advance the workpiece 12 until the tapered thread rolls 30 reach a predetermined position such that a predetermined portion, such as ramped portion 52, for example, of the workpiece 12 has been threaded by the tapered thread rolls 30 to create a threaded workpiece 12 including a tapered thread portion 54. In at least one embodiment, referring to FIG. 13, the predetermined portion may include the entire ramped portion 52, resulting in a threaded region that includes a non-tapered thread portion, as well as a tapered thread portion 54 located where ramped portion 52 previously existed on the unrolled workpiece. Further, the rotary machine 10 may comprise a CNC rotary machine, such as a CNC lathe as discussed above. The CNC rotary machine may provide control over the relative workpiece-to-thread rolling tool position, the feed rate, and/or other machining variables such that a precise positioning of the thread rolling tool 11 with respect to the ramped portion 52 may be achieved. Once the predetermined position has been reached and/or the predetermined portion threaded, the rotary machine may stop advancing the workpiece towards the thread rolling tool and/or vice versa. Thereafter, the threaded workpiece 12 may be retracted away from the thread rolling tool 11 by reversing the rotational direction RD of the thread rolling tool 11 and retracting the workpiece 12 therefrom such that during retraction the annular rings of the thread rolls 30 track back along the newly rolled thread lead in the workpiece 12.

Additionally, as noted above, referring to FIG. 9, various features, such as features 51, 52, and 55, may be machined or created in the workpiece 12 by one or more turning tools, such as turning tool 14 depicted in FIG. 1, for example, prior to advancing the workpiece 12 toward and/or into contact with the thread rolling tool 11. In at least one embodiment, the workpiece 12 may be retained in the rotary machine 10 after machining the features such that the workpiece 12 and the thread rolling tool 11 remain centered on the longitudinal axis L. Finally, after machining any desired features and/or rolling threads on the workpiece 12, the workpiece 12 may be removed from the rotary machine. In at least one embodiment, the threaded workpiece 12 may comprise a polished rod as specified in the API 11B standard, discussed above.

Further, in at least one embodiment, and as discussed above, referring to FIG. 1, the rotary machine 10 may comprise a CNC rotary machine, such as a CNC lathe, for example. The CNC lathe may include a rigid or synchronous tapping cycle such that the translation of the workpiece in the first direction D1 and/or the second directions D2 and the rotation of the thread rolling tool 11 are in sync and the feed rate may correlate with the rotation speed. This synchronized and correlated movement may be arranged to create an appropriate helical thread lead in the workpiece 12, and also immediately reverse the rotational direction of the thread rolling tool 11 relative to the workpiece 12 and retract the workpiece 12 from the thread rolling tool 11 in a coordinated fashion at the appropriate time. Additionally, as mentioned above, the rotary machine 10 may comprise a spindle configured to hold the thread rolling tool 11. Likewise, the feed device 13 may grip the workpiece 12. Referring to FIG. 11, the rotation of the spindle and the feed rate provided by the feed device 13 (FIG. 1) may be in sync with each other such that as the thread rolls 30 feed onto or are fed workpiece 12 axially, the rolls 30 may penetrate up the ramp portion 52 of the workpiece 12, displacing material to create the threads 53 in the workpiece 12. However, the translation of the workpiece 12 relative to the thread rolls 30 should not proceed too far before the spindle reverses, since otherwise damage to the thread rolls may occur.

A high degree of success in the above-described method may be enhanced by ensuring a precise axial relationship between the thread rolling tool 11 and the workpiece 12. Accordingly, the various components of the thread rolling tool 11 may be manufactured to ensure high quality. For example, referring to FIG. 3, the die holder 22 and body 20 may be manufactured from heat-treated hardened steel and may be machined to very close tolerances. The thread roll shafts 24 may be made from ground solid carbide. The thread rolls 30 may be made from tool or high speed steel, and the angled portions of the thread rolls may be designed and manufactured in such a manner as to progressively displace material as the 9° cone angle θ is axially formed on the workpiece. Likewise, the workpiece 12 may be precisely produced and located each time, which may be accomplished by not repositioning the workpiece 12 from a blank preparation stage, where various features such as features 51, 52, and/or 55 are added to the workpiece, for example, to a thread rolling stage, where the thread rolls 30 are applied to the workpiece 12.

In more detail, various non-limiting embodiments herein provide a method, system, and/or device for axially roll-forming 10P API threads including a tapered 9° cone according to the API 11B polished rod standard by using a thread rolling tool 11 mounted to a metal-working, rotary machine 10 that may include a threading cycle whereby the feed rate or pitch is synchronized with the spindle speed. The thread rolling tool may include a specifically designed set of three tapered thread rolls 30 for the purpose of roll-forming 10P API polished rod threads and the adjacent 9° thread cone as outlined in API Specification 11B, in a single pass application. The 9° cone of the threads may be at least partially formed by the design of the set of three thread rolls 30, so that when the thread rolls 30 are installed in the thread rolling tool 11 and applied to the machine 10, the controlled position of the end-point, that is, the end of the thread rolling tool's advancement, may generate the desired thread cone angle and position on the workpiece 12.

Additionally, in at least one embodiment, the API 11B standard for polished rods establishes a point at a measured distance from the end of the rod at which the 9° cone angle θ of a final thread lead should be located. This apex for the start of the 9° cone is also relative to the size of the desired thread. As the thread rolling tool 11 advances toward the end-point or the apex of the 9° cone angle θ, with the face plane of the thread rolls 30 and the thread position stepped ⅓ of the pitch distance, and with the desired cone angle apex at a constant position (such as that defined by the interface of the ramp portion 52 and the flat portion 51), then each starting diameter of the 9° cone may be different on each individual thread roll in order to match-up to the cone apex point that is ⅓ of the pitch distance around the workpiece. Referring to FIG. 6, the first thread roll 31 may include a first cone diameter or first outer diameter OD1, the second thread roll 32 may include a second cone diameter or second outer diameter OD2, and the third thread roll 33 may include a third cone diameter or third outer diameter OD3. These outer diameters OD1, OD2, OD3 may be sized such that as the set of thread rolls 30 approach the end-point as shown in FIGS. 12 and 13, the cone angle θ is fully-formed just prior to the machine program initiating a reverse cycle to back the thread rolling tool 11 off the roll-formed workpiece 12. By properly selecting the outer diameters OD1, OD2, and OD3 to correspond to the actual position of the 9° cone apex ⅓ of the pitch distance around the workpiece, the thread rolls 30 may thereby produce a gaugeable rolled thread including a 9° cone angle, for example.

The rolled threads of a threaded workpiece, including the angled threads produced by various embodiments described herein may be significantly stronger than any similar threads produced by other techniques, such as cutting the appropriate angle onto pre-tapered threads.

In at least one non-limiting embodiment, utilizing tapered thread rolls 30 with the non-opening operation of the thread rolling tool 11 and/or a positively controlled machine cycle provided by the rotary machine 10 for position and feed rate when used for threading-on and threading-off the workpiece may work in unison to generate a polished rod thread which conforms to API 11B standards.

Additionally, one may apply geometric principles similar to those described above to establish the starting cone diameters or outer diameters OD1, OD2, OD3 on tapered thread rolls in order to generate thread rolls for NPT and other similar threads, for example. Such a set of tapered thread rolls may be used in conjunction with a thread rolling tool, such as thread rolling tool 11, and/or a synchronized machine threading cycle provided by a rotary machine, such as machine 10 (see FIG. 1).

The present disclosure has been written with reference to various exemplary, illustrative, and non-limiting embodiments. However, it will be recognized by persons having ordinary skill in the art that various substitutions, modifications, or combinations of any of the disclosed embodiments (or portions thereof) may be made without departing from the scope of the invention. Thus, it is contemplated and understood that the present disclosure embraces additional embodiments not expressly set forth herein. Such embodiments may be obtained, for example, by combining, modifying, or reorganizing any of the disclosed steps, components, elements, features, aspects, characteristics, limitations, and the like, of the embodiments described herein. In this manner, Applicants reserve the right to amend the claims during prosecution to add features as variously described herein.

What is claimed is:

1. A set of tapered thread rolls for use in a thread rolling tool, the set of thread rolls comprising:
    a first thread roll comprising
        a first cylindrical body comprising an end and a circumferential surface, wherein the cylindrical body defines a longitudinal axis, and
        a first set of annular rings protruding from the circumferential surface of the first body, wherein at least a portion of the first set of annular rings comprises an angled portion comprising at least two truncated annular rings that are truncated relative to at least one additional annular ring, wherein each of the at least two truncated annular rings defines an angled surface portion, and wherein the angled surface portions of the at least two truncated annular rings together define a line having an angle with respect to the longitudinal axis that is greater than zero degrees; and
    a second thread roll comprising
        a second cylindrical body comprising an end and a circumferential surface, wherein the cylindrical body defines a longitudinal axis, and
        a second set of annular rings protruding from the circumferential surface of the second body, wherein at least a portion of the second set of annular rings comprises an angled portion comprising at least two truncated annular rings that are truncated relative to at least one additional annular ring, wherein each of the at least two truncated annular rings defines an angled surface portion, and wherein the angled surface portions of the at least two truncated annular rings together define a line having an angle with respect to the longitudinal axis that is greater than zero degrees;
    wherein the first set of annular rings and the second set of annular rings are offset from each other by an offset spacing with respect to a plane when the end of the first cylindrical body and the end of the second cylindrical body are aligned along the plane.

2. The set of thread rolls of claim 1, wherein the first cylindrical body defines a first outer diameter at the end of the first cylindrical body, the second cylindrical body defines a second outer diameter at the end of the second cylindrical body, and the first outer diameter is larger than the second outer diameter.

3. The set of thread rolls of claim 1, wherein the first set of annular rings defines a pitch distance between each of the first annular rings, wherein the offset spacing is equal to one pitch distance divided by the number of thread rolls in the set of thread rolls.

4. The set of thread rolls of claim 1, further comprising a third thread roll comprising:
    a third cylindrical body comprising an end and a circumferential surface, wherein the cylindrical body defines a longitudinal axis; and a third set of annular rings protruding from the circumferential surface of the third cylindrical body, wherein at least a portion of the third set of annular rings comprises an angled portion comprising at least two truncated annular rings that are truncated relative to at least one additional annular ring, wherein each of the at least two truncated annular rings defines an angled surface portion, and wherein the angled surface portions of the at least two truncated annular rings together define a line having an angle with respect to the longitudinal axis that is greater than zero degrees;

wherein the first set of annular rings, the second set of annular rings, and the third set of annular rings are offset from each other by the offset spacing.

5. The set of thread rolls of claim 1, wherein the angles of the line defined by at least a portion of the first set of annular rings and the line defined by at least a portion of the second set of annular rings are approximately 9°.

6. The set of thread rolls of claim 1, wherein the line of each thread roll is defined by angled surface portions of at least four truncated annular rings.

\* \* \* \* \*